United States Patent
Mellet et al.

(10) Patent No.: US 9,689,481 B2
(45) Date of Patent: Jun. 27, 2017

(54) ONE MODE CONTINUOUSLY VARIABLE TRANSMISSION WITH LOW LOSS CONFIGURATION

(71) Applicant: GM Global Technology Operations LLC, Detroit, MI (US)

(72) Inventors: Edward W. Mellet, Rochester Hills, MI (US); James M. Hart, Belleville, MI (US); Clinton E. Carey, Highland, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 336 days.

(21) Appl. No.: 14/477,459

(22) Filed: Sep. 4, 2014

(65) Prior Publication Data

US 2016/0069441 A1  Mar. 10, 2016

(51) Int. Cl.
  *F16H 37/02*  (2006.01)
  *F16H 37/08*  (2006.01)

(52) U.S. Cl.
  CPC ....... *F16H 37/022* (2013.01); *F16H 37/0813* (2013.01); *F16H 2200/0008* (2013.01); *F16H 2200/2035* (2013.01); *F16H 2702/02* (2013.01)

(58) Field of Classification Search
  CPC .................................................. F16H 37/022
  See application file for complete search history.

(56) References Cited

U.S. PATENT DOCUMENTS

| | | | | |
|---|---|---|---|---|
| 5,853,343 A | * | 12/1998 | Eggert | F16H 37/022 475/210 |
| 6,997,831 B2 | * | 2/2006 | Kanda | F16H 37/021 474/8 |
| 8,579,753 B2 | | 11/2013 | Heitzenrater et al. | |
| 2013/0130859 A1 | | 5/2013 | Lundberg et al. | |
| 2013/0324355 A1 | | 12/2013 | Xie et al. | |
| 2013/0333508 A1 | | 12/2013 | Lundberg et al. | |
| 2014/0038761 A1 | | 2/2014 | Xu | |

OTHER PUBLICATIONS

Pending U.S. Appl. No. 14/269,794, filed May 5, 2014, by Phillip C. Lundberg. All pages.
Pending U.S. Appl. No. 14/262,068, filed Apr. 25, 2014, by Edward W. Melllet. All pages.
(Continued)

*Primary Examiner* — Derek D Knight

(57) ABSTRACT

A one mode, front wheel drive continuously variable transmission includes a transmission input member interconnected to an engine of the motor vehicle, a transmission output member, a continuously variable unit having a first pulley pair, a second pulley pair, and a chain wrapped around the first pulley pair and the second pulley pair. A planetary gear set includes a first member, a second member, and a third member. The first member is connected to the first pulley pair and the third member is connected to the transmission input member. A clutch is selectively engageable to connect the first member of the planetary gear set with the transmission input member. A band brake selectively engageable to connect the second member with a stationary member. The transmission output member is interconnected to a differential supported by sets of ball bearings.

19 Claims, 2 Drawing Sheets

(56) References Cited

OTHER PUBLICATIONS

Figure 1:
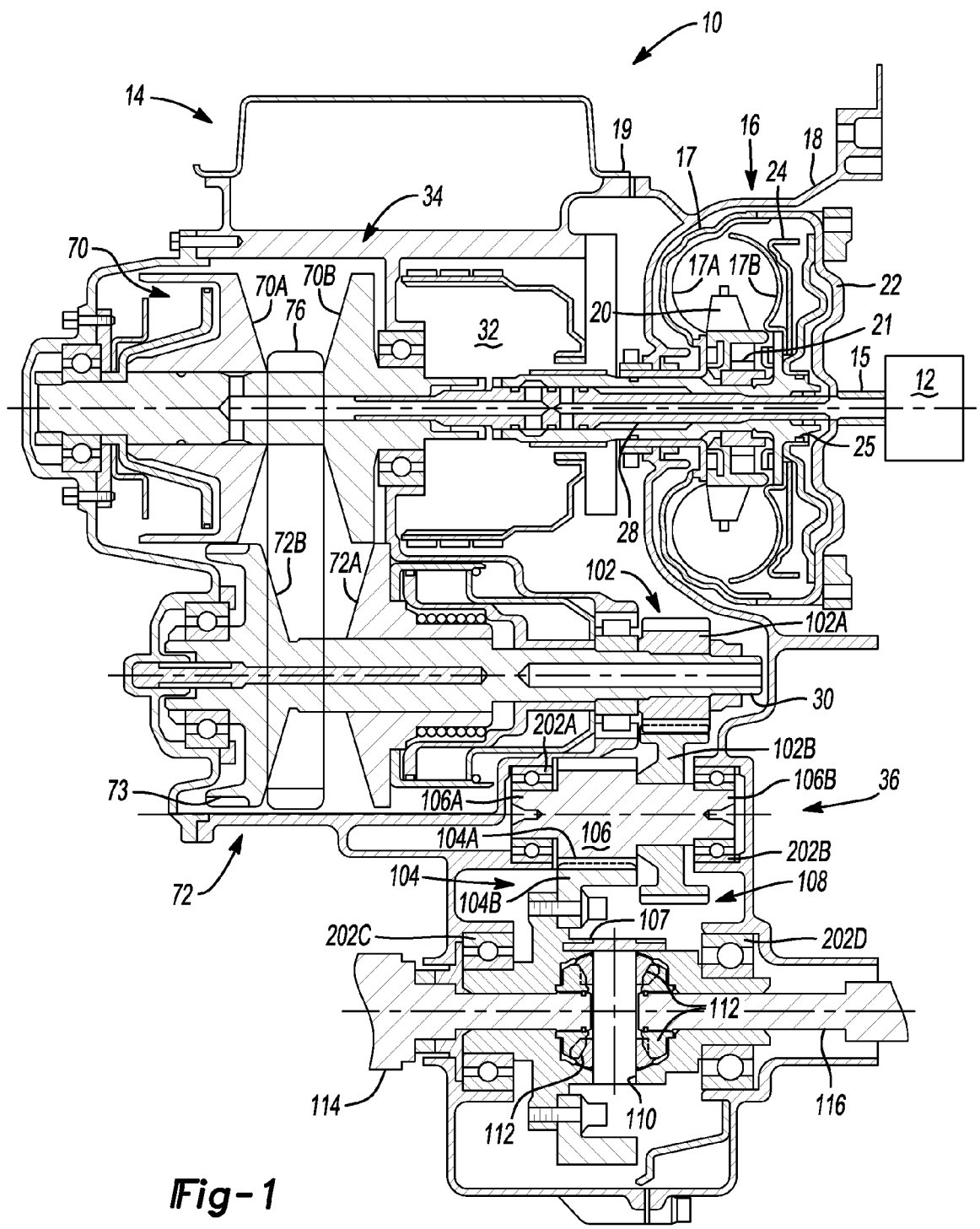

Pending U.S. Appl. No. 14/247,867, filed Apr. 8, 2014, by John C. Schultz. All pages.
Pending U.S. Appl. No. 14/261,053, filed Apr. 24, 2014, by Edward W. Mellet. All pages.
Pending U.S. Appl. No. 14/321,084, filed Jul. 1, 2014, by Edward W. Mellet. All pages.
Pending U.S. Appl. No. 14/269,801, filed May 5, 2014, by Phillip C. Lundberg. All pages.
Pending U.S. Appl. No. 14/466,128, filed Aug. 22, 2014, by Edward W. Mellet. All pages.
Pending U.S. Appl. No. 61/942,426, filed Feb. 20, 2014, by Pete R. Garcia. All pages.
Pending U.S. Appl. No. 14/257,573, filed Apr. 21, 2014, by Tejinder Singh. All pages.

\* cited by examiner

ONE MODE CONTINUOUSLY VARIABLE TRANSMISSION WITH LOW LOSS CONFIGURATION

FIELD

The present disclosure relates to automatic transmissions and more particularly to a one mode continuously variable transmission for a front wheel drive motor vehicle having low loss configurations to improve efficiency.

BACKGROUND

The statements in this section merely provide background information related to the present disclosure and may or may not constitute prior art.

A continuously variable transmission ("CVT") typically includes a chain and pulley system that operatively couples a rotary power source, such as an engine or electric motor, to a double gear final drive unit. The chain and pulley system generally includes first and second pairs of pulley cones having a torque transmitting chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

There is a constant need for improved CVT designs that minimize axial length and mass while providing sufficient performance characteristics. However, the inclusion of low-loss devices in the CVT complicates the arrangement and packaging of these devices. Therefore, there is a need in the art for a powertrain having a CVT with low-loss configurations that is properly packaged to minimize axial length and mass.

SUMMARY

A one mode, front wheel drive continuously variable transmission having low-loss configurations is provided. The CVT includes a transmission input member interconnected to an engine of the motor vehicle, a transmission output member, a continuously variable unit having a first pulley pair, a second pulley pair, and a chain wrapped around the first pulley pair and the second pulley pair, a planetary gear set having a first member, a second member, and a third member, wherein the first member is connected to the first pulley pair and the third member is connected to the transmission input member, a clutch selectively engageable to connect the first member of the planetary gear set with the transmission input member, and a band brake selectively engageable to connect the second member with a stationary member.

In one example of the CVT, the band brake includes a drum and a band wrapped around the drum, wherein the band is connected to the stationary member and the drum is connected to the second member of the planetary gear set.

In another example of the CVT, the second member includes a first portion and a second portion, wherein the first portion extends radially and is connected to the drum and the second portion extends axially.

In another example of the CVT, a first bearing is disposed between the drum and the stationary member and a second bearing is disposed between the second portion of the second member of the planetary gear set and the stationary member.

In another example of the CVT, the first and second bearings are bushings or plain bearings.

In another example of the CVT, the first and second bearings are roller bearings.

In another example of the CVT, the drum surrounds the planetary gear set and the clutch, and the first and second roller bearings are disposed on axially opposite sides of the planetary gear set and the clutch.

In another example of the CVT, a transfer member is interconnected to the transmission output member and a differential is interconnected to the transfer member, wherein the transfer member is supported radially and axially by a first set of ball bearings at one end and supported radially and axially by a second set of ball bearings at an opposite end.

In another example of the CVT, the differential is supported radially and axially by a third set of ball bearings at one end and supported radially and axially by a fourth set of ball bearings at an opposite end.

In another example of the CVT, a drive gear is connected to the transmission output member and the drive gear is in mesh with a driven gear connected to the transfer member.

In another example of the CVT, the first member of the planetary gear set is a sun gear member, the second member of the planetary gear set is a carrier member, and the third member of the planetary gear set is a ring gear member.

In another example of the CVT, the stationary member is a transmission housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

Figure 2:
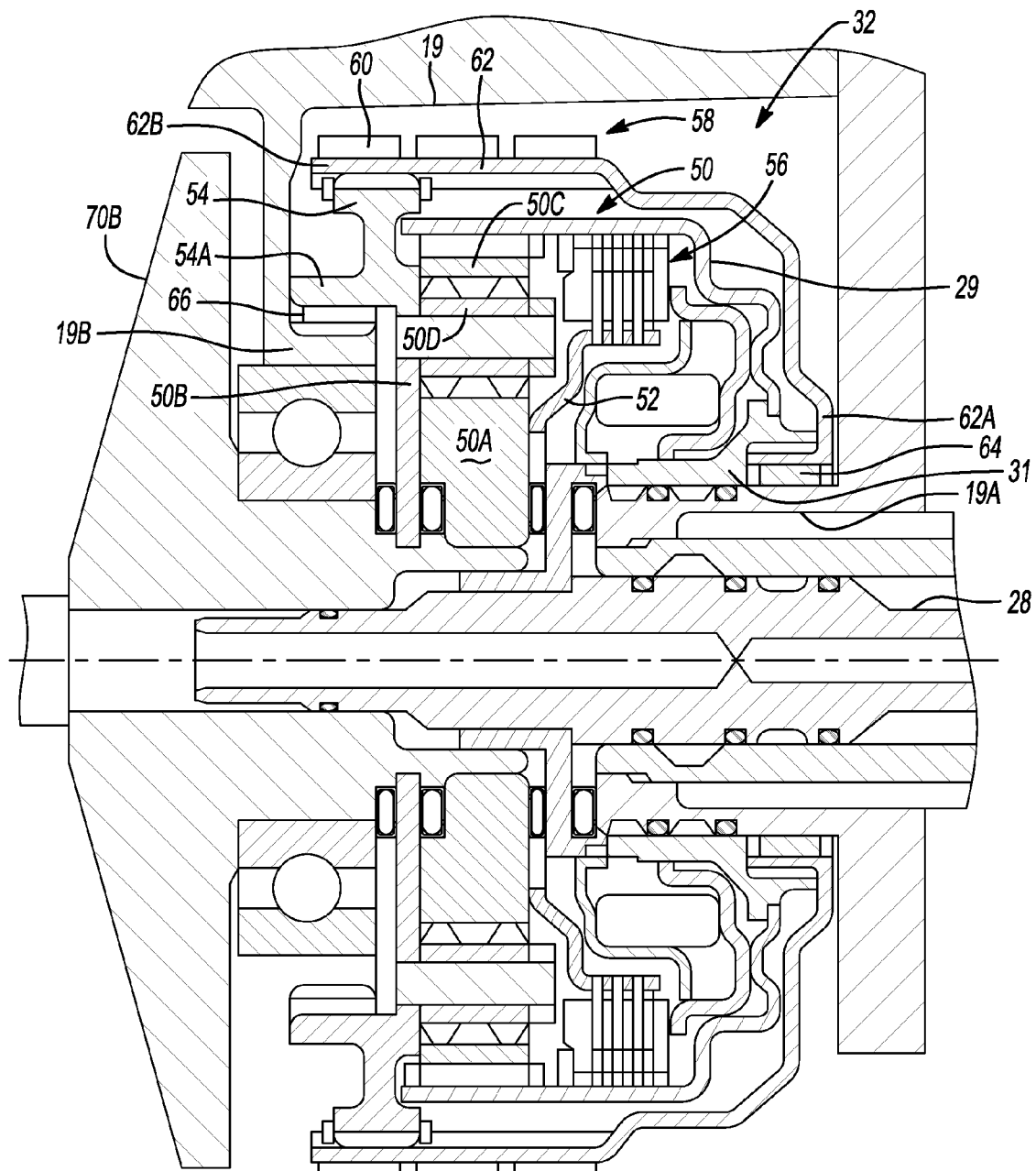

FIG. 1 is a schematic diagram of a powertrain according to the principles of the present invention; and FIG. 2 is a cross-section a planetary gear set assembly used in the powertrain according to the principles of the present invention.

DETAILED DESCRIPTION

The following description is merely exemplary in nature and is not intended to limit the present disclosure, application, or uses.

With reference to FIGS. 1 and 2, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 includes an engine output shaft 15 that supplies a driving torque to the transmission 14 through a torque converter 16.

The torque converter 16 includes a torus 17 contained within a torque converter housing 18. The torque converter housing 18 is coupled to a transmission housing 19. The torus 17 includes a pump 17A, a stator 20 which connects to the transmission housing 19 through a one-way clutch 21 to provide for torque multiplication, and a turbine or output 17B. The pump 17A is connected to the engine output shaft 15 by a shaft or member 22. The torque converter 16 may further include a spring/damper assembly connected to the turbine 17B to minimize vibrations from the engine 12 to the transmission 14. The turbine 17B is connected to a turbine shaft 25. The turbine shaft 25 is connected to an input of the transmission 14, as will be described below. In alternate embodiments, the spring damper assembly 24 may include a clutch to bypass the torque converter 17, two or three stage spring/damper assemblies, tuned absorbers, or a pendulum damper.

The transmission 14 is a variable diameter pulley or sheave drive continuously variable transmission (CVT). The transmission 14 includes a typically cast, metal housing 19 which encloses and protects the various components of the transmission 14. The housing 19 includes a variety of apertures, passageways, shoulders and flanges which position and support these components. Generally speaking, the transmission 14 includes a transmission input shaft 28 and a transmission output shaft 30. The transmission input shaft 28 is connected via a spline to the output or turbine shaft 25 of the torque converter 16. Connected between the transmission input shaft 28 and the transmission output shaft 30 is a planetary gear set assembly 32 (shown in detail in FIG. 2) and a pulley assembly or continuously variable unit (CVU) 34 that cooperate to provide forward and reverse speed or gear ratios between the transmission input shaft 28 and the transmission output shaft 30. The transmission input shaft 28 is functionally interconnected with the engine 12 through the torque converter 16 and receives input torque or power from the engine 12. The transmission output shaft 30 is preferably connected with a final drive unit 36. The transmission output shaft 30 provides drive torque to the final drive unit 36. The final drive 36 unit may include a differential, axle shafts, and road wheels (not shown).

Turning to FIG. 2, the planetary gear assembly 32 includes a planetary gear set 50. The planetary gear set 50 includes a sun gear member 50A, a planet carrier member 50B and a ring gear member 50C. The planet carrier member 50B rotatably supports a set of planet gears 50D (only two of which are shown). The planet gears 50D are each configured to intermesh with both the sun gear member 50A and the ring gear member 50C.

The sun gear member 50A is connected for common rotation with a first shaft or interconnecting member 52 and with a second truncated conical sheave or member 70B of the CVU 34, as will be described below. The planet carrier member 50B includes an interconnecting portion or member 54. Alternatively the interconnecting portion 54 and the planet carrier member 50B may be separate members. The ring gear member 50C is connected for common rotation with the transmission input shaft or member 28 via one or more intervening connecting members. In the example provided, the ring gear member 50C is connected to a clutch housing member 29 which is connected to an intermediate member 31. The intermediate member 31 is connected to the transmission input member 28 via a spline connection.

Moreover, torque-transmitting mechanisms including a clutch 56 and a brake 58 are provided to allow for selective interconnection of the shafts or interconnecting members, members of the planetary gear sets and the housing. The clutch 56 is a friction, dog or synchronizer type mechanisms or the like. The clutch 56 is selectively engageable to connect the first interconnecting shaft or member 52 with the clutch housing 29, thereby connecting the sun gear member 50A with the transmission input member 28. The brake 58 is a band brake having a band 60 wrapped around a drum 62. The band brake 58 has low spin-losses compared to a conventional friction brake. The band 60 is connected to the transmission housing 19. The drum 62 is connected to the interconnecting portion 54 of the planet carrier member 50B. Servos or other actuating devices (not shown) selectively tighten the band 60 around the drum 62 in order to selectively connect and restrict relative rotation of the planet carrier member 50B to the transmission housing 19. A first bearing 64 is disposed between a first end 62A of the drum 62 and a first axially extended portion 19A of the transmission housing 19. A second bearing 66 is disposed between a second axially extended portion 19B of the transmission housing 19 and an axial flange 54A of the interconnecting portion 54 of the carrier member 50B. The second bearing 66 radially supports a second end 62B of the drum 62 through the carrier member 50B. The drum 62 surrounds the planetary gear set 50 and the clutch 56, and the first and second bearings 64, 66 are disposed on axially opposite sides of the planetary gear set 50 and the clutch 56. In one example, the bearings 64, 66 are plain bearings or bushings. In another example, the bearings 64, 66 are roller bearings. The clutch 56 is engaged to provide forward speed or gear ratios. The brake 58 is engaged to provide reverse speed or gear ratios.

Returning to FIG. 1, the pulley assembly 34 includes a first pulley or sheave pair 70 and a second pulley or sheave pair 72. The first pulley 70 includes a first truncated conical sheave or member 70A and second truncated conical sheave or member 70B in axial alignment with the first truncated conical sheave 70A. The second sheave 70B is directly connected for rotation with the sun gear member 50A or the first interconnecting member 52 and alternatively is integrally formed with the first interconnecting member 52. The first sheave 70A is moveable axially relative to the second sheave 70B by a hydraulic control system (not shown) or other actuating system. It should be appreciated that the sheaves 70A and 70B may be axially switched without departing from the scope of the present invention.

The second pulley 72 includes a first truncated conical sheave or member 72A and second truncated conical sheave or member 72B in axial alignment with the first truncated conical sheave 72A. The second sheave 72B is integrally formed with the transmission output shaft 30 or may be directly connected for rotation with the transmission output shaft 30. The first sheave 72A is moveable axially relative to the second sheave 72B by a hydraulic control system (not shown) or other actuating system. It should be appreciated that the sheaves 72A and 72B may be axially switched without departing from the scope of the present invention. Furthermore, the sheave 72B includes a park gear 73 disposed on an outer diameter of the sheave 72B. The park gear 73 is connectable with a park mechanism (not shown).

A torque transmitting chain or endless member 76 having a V-shaped cross section is mounted between the first pulley pair 70 and the second pulley pair 72. The chain 76 exhibits higher efficiency compared to a conventional belt. Drive torque communicated from the sun gear member 50A is transferred via friction between the sheaves 70A and 70B and the chain 76. The ratio of the input pulley 70 to the output pulley 72 is adjusted by varying the spacing between the sheaves 70A and 70B and between the sheaves 72A and 72B. For example, to change the ratio between the pulleys 70 and 72, the axial distance between sheaves 70A and 70B may be reduced by moving sheave 70A towards sheave 70B while simultaneously the axial distance between sheave 72A and 72B may be increased by moving sheave 72A away from sheave 72B. Due to the V-shaped cross section of the chain 76, the chain 76 rides higher on the first pulley 70 and lower on the second pulley 72. Therefore the effective diameters of the pulleys 70 and 72 change, which in turn changes the overall gear ratio between the first pulley 70 and the second pulley 72. Since the radial distance between the pulleys 70 and 72 and the length of the chain 76 is constant, the movement of the sheaves 70A and 72A must occur simultaneously in order to maintain the proper amount of tension on the chain 76 to assure torque is transferred from the pulleys 70, 72 to the chain 76.

The pulley assembly 34 transfers torque to the final drive unit 36. The final drive unit 36 includes a first co-planar gear set 102 and a second co-planar gear set 104. The first gear set 102 includes a drive gear 102A intermeshed with a driven gear 102B. The driven gear 102B is connected to a transfer shaft or member 106. The transfer shaft 106 is connected to a drive gear 104A of the second planar gear set 104. The drive gear 104A is intermeshed with a driven gear 104B. The drive gear 104A may be formed as a sprocket or spline on the transfer shaft 106. The driven gear 104B is connected to a housing 107 of a differential or pinion/gear assembly 108. The drive ratios of the first and second gear sets are designed to be flex gear meshes to provide the widest range of final drive ratios.

The pinion/gear assembly 108 includes a pin 110 that engages with a set of pinion gears 112 such that torque from the transmission 14 is transmitted through the housing 107 through the pin 110 and pinion gears 112 to a set of axles 114 and 116 that drive the front wheels of the motor vehicle.

The transfer shaft 106 is supported at one end 106A by a first set of ball bearings 202A and supported at another, opposite end 106B by a second set of ball bearings 202B. The housing 107 of the pinion/gear assembly 108 is supported by a third set of ball bearings 202C and a fourth set of ball bearings 202D. The ball bearings transfer axial and radial loads from the final drive unit 36 to the transmission housing 19. The ball bearing sets 202A, 202B, 202C, and 202D have lower spin-losses compared to tapered roller bearings while supporting loads in both the axial and radial directions. The combination of the band brake 58, the chain drive 76, and the ball bearing sets 202A, 202B, 202C, and 202D provide synergistic efficiency gains for the transmission 14.

The description of the invention is merely exemplary in nature and variations that do not depart from the gist of the invention are intended to be within the scope of the invention. Such variations are not to be regarded as a departure from the spirit and scope of the invention.

The following is claimed:

1. A continuously variable transmission for a motor vehicle comprising:
   a transmission input member interconnected to an engine;
   a transmission output member;
   a continuously variable unit having a first pulley pair, a second pulley pair, and a chain wrapped around the first pulley pair and the second pulley pair;
   a planetary gear set having a first member, a second member, and a third member, wherein the first member is connected to the first pulley pair and the third member is connected to the transmission input member;
   a clutch selectively engageable to connect the first member of the planetary gear set with the transmission input member;
   a band brake selectively engageable to connect the second member with a stationary member, the band brake having a drum and a band wrapped around the drum, wherein the drum surrounds the planetary gear set and the clutch; and
   a first bearing and a second bearing disposed on axially opposite sides of the planetary gear set and the clutch.

2. The continuously variable transmission of claim 1 wherein the band is connected to the stationary member and the drum is connected to the second member of the planetary gear set.

3. The continuously variable transmission of claim 2 wherein the second member includes a first portion and a second portion, wherein the first portion extends radially and is connected to the drum and the second portion extends axially.

4. The continuously variable transmission of claim 3 wherein the first bearing is disposed between the drum and the stationary member and the second bearing is disposed between the second portion of the second member of the planetary gear set and the stationary member.

5. The continuously variable transmission of claim 1 further comprising a transfer member interconnected to the transmission output member and a differential interconnected to the transfer member, wherein the transfer member is supported radially and axially by a first set of ball bearings at one end and supported radially and axially by a second set of ball bearings at an opposite end.

6. The continuously variable transmission of claim 5 wherein the differential is supported radially and axially by a third set of ball bearings at one end and supported radially and axially by a fourth set of ball bearings at an opposite end.

7. The continuously variable transmission of claim 6 wherein further comprising a drive gear connected to the transmission output member, wherein the drive gear is in mesh with a driven gear connected to the transfer member.

8. The continuously variable transmission of claim 1 wherein the first member of the planetary gear set is a sun gear member, the second member of the planetary gear set is a carrier member, and the third member of the planetary gear set is a ring gear member.

9. The continuously variable transmission of claim 1 wherein the stationary member is a transmission housing.

10. A powertrain in a motor vehicle comprising:
    an engine;
    a torque converter connected to the engine;
    a continuously variable transmission including:
      a transmission input member connected to the torque converter;
      a transmission output member;
      a continuously variable unit having a first pulley pair, a second pulley pair, and a chain wrapped around the first pulley pair and the second pulley pair;
      a planetary gear set having a first member, a second member, and a third member, wherein the first member is connected to the first pulley pair and the third member is connected to the transmission input member;

a clutch selectively engageable to connect the first member of the planetary gear set with the transmission input member;

a band brake selectively engageable to connect the second member with a stationary member, wherein the band brake includes a drum and a band wrapped around the drum, wherein the band is connected to the stationary member and the drum is connected to the second member of the planetary gear set, and wherein the drum surrounds the planetary gear set and the clutch;

a first bearing disposed between the drum and the stationary member to radially support the drum; and a second bearing disposed between the second member of the planetary gear set and the stationary member to radially support the drum.

11. The powertrain of claim 10 wherein the first and second bearings are disposed on axially opposite sides of the planetary gear set and the clutch and wherein the first and second bearings are plain bearings or bushings.

12. The powertrain of claim 11 wherein the second member includes a first portion and a second portion, wherein the first portion extends radially and is connected to the drum and the second portion extends axially and is supported radially by the second bearing.

13. The powertrain of claim 10 further comprising a transfer member interconnected to the transmission output member and a differential interconnected to the transfer member, wherein the transfer member is supported radially and axially by a first set of ball bearings at one end and supported radially and axially by a second set of ball bearings at an opposite end.

14. The powertrain of claim 13 wherein the differential is supported radially and axially by a third set of ball bearings at one end and supported radially and axially by a fourth set of ball bearings at an opposite end.

15. The powertrain of claim 14 wherein further comprising a drive gear connected to the transmission output member, wherein the drive gear is in mesh with a driven gear connected to the transfer member.

16. The powertrain of claim 10 wherein the first member of the planetary gear set is a sun gear member, the second member of the planetary gear set is a carrier member, and the third member of the planetary gear set is a ring gear member.

17. The powertrain of claim 10 wherein the stationary member is a transmission housing.

18. A powertrain in a motor vehicle comprising:
an engine;
a torque converter connected to the engine;
a continuously variable transmission including:
    a transmission input member connected to the torque converter;
    a transmission output member;
    a continuously variable unit having a first pulley pair, a second pulley pair, and a chain wrapped around the first pulley pair and the second pulley pair;
    a planetary gear set having a first member, a second member, and a third member, wherein the first member is connected to the first pulley pair and the third member is connected to the transmission input member;
    a clutch selectively engageable to connect the first member of the planetary gear set with the transmission input member;
    a band brake selectively engageable to connect the second member with a stationary member, wherein the band brake includes a drum and a band wrapped around the drum, wherein the band is connected to the stationary member and the drum is connected to the second member of the planetary gear set, and wherein the drum surrounds the planetary gear set and the clutch;
    a first bearing disposed between the drum and the stationary member to radially support the drum; and
    a second bearing disposed between the second member of the planetary gear set and the stationary member to radially support the drum;
    a transfer member interconnected to the transmission output member, wherein the transfer member is supported radially and axially by a first set of ball bearings at one end and supported radially and axially by a second set of ball bearings at an opposite end; and
    a differential interconnected to the transfer member, wherein the differential is supported radially and axially by a third set of ball bearings at one end and supported radially and axially by a fourth set of ball bearings at an opposite end.

19. The powertrain of claim 18 wherein the first member of the planetary gear set is a sun gear member, the second member of the planetary gear set is a carrier member, and the third member of the planetary gear set is a ring gear member.

* * * * *